United States Patent Office 3,212,710
Patented Oct. 19, 1965

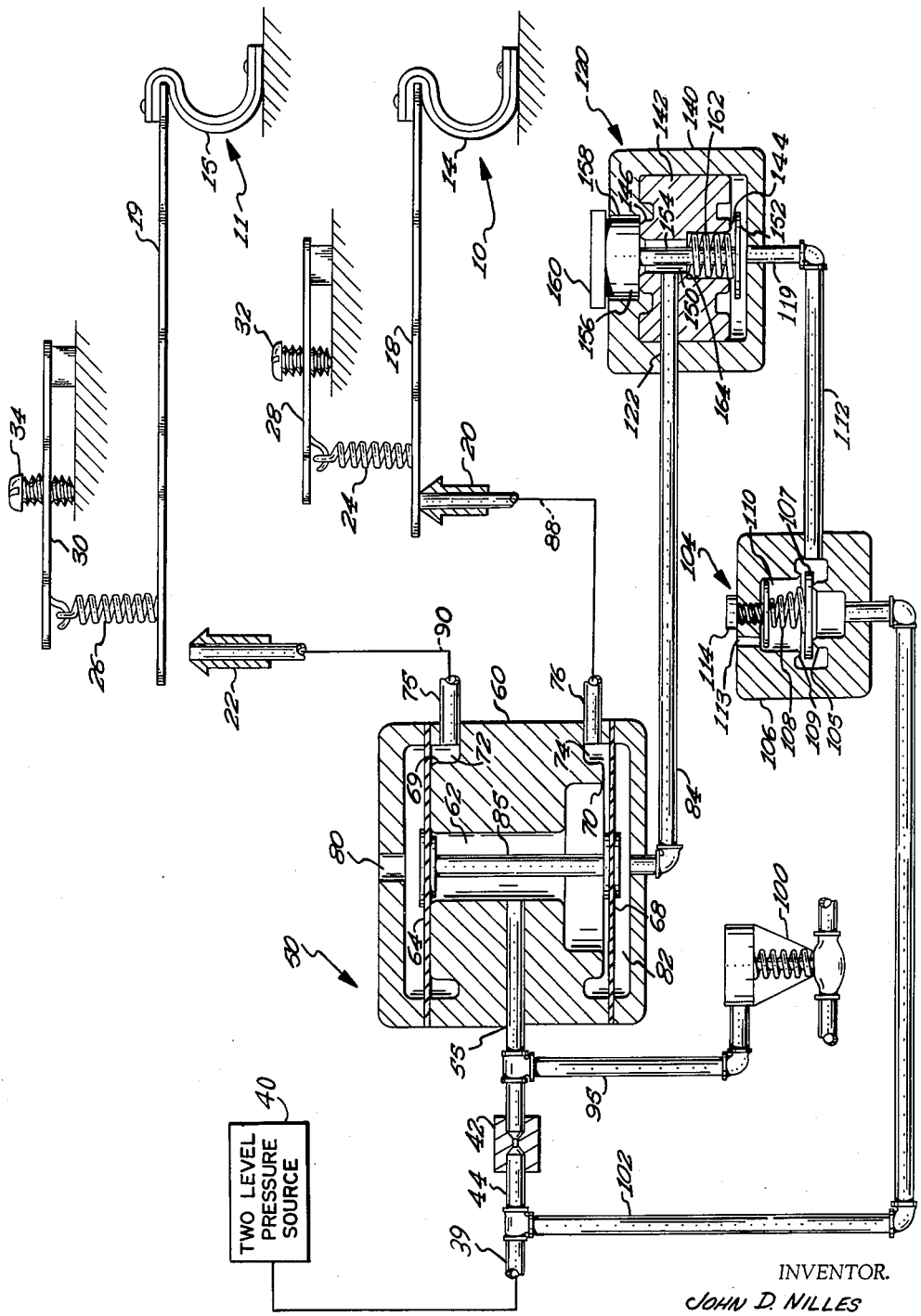
INVENTOR.
JOHN D. NILLES
BY Alfred N. Feldman
ATTORNEY

3,212,710
DAY-NIGHT SETBACK CONTROL FOR
THERMOSTAT SYSTEMS
John D. Nilles, Roselle, Ill., assignor to Honeywell Inc.,
a corporation of Delaware
Filed Aug. 28, 1963, Ser. No. 305,119
11 Claims. (Cl. 236—47)

This invention relates to temperature regulation and more particularly to an improved thermostat system of the selective control type capable of day-night operation and with provision for night setback operation.

Temperature control systems or thermostat systems of this general type are used chiefly in large buildings in which one desired temperature level or setting is normally utilized during a period of occupancy, such as the daytime, and a second or lower temperature level or setting of the thermostat system is utilized during the period of limited or no occupancy, such as night. It is sometimes desirable during the period of lower occupancy and low temperature setting in a building that certain portions thereof be controlled at daytime temperature levels to accommodate after hours occupancy. This provision is generally referred to as night setback. While it is obvious that such changes in thermostat settings could be effected manually, it is desirable for uniformity in operation and temperature control and to reduce the maintenance cost of such resetting that as much of the temperature control adjustment in settings be effected automatically as is possible. In the past it has been well recognized that day-night operation may be effected by a change in the control air pressure applied to pneumatic thermostats by mechanical adjustment of the setting mechanism with a clock or by producing a series of pulses which would operate on the thermostat to readjust the same.

The present invention is directed to an arrangement in which a thermostat system, shown herein as including separate thermostats, is utilized for day-night operation with settings which are relatively fixed. Changeover between the respective thermostats pneumatically for day-night operation is effected by a change in control air pressure to the thermostat system. The provision for night setback or readjustment of the thermostat system for night occupancy during limited periods has been accomplished through a simplified pneumatic latching means which removes the requirement of complex mechanisms added to the thermostat. The present invention is shown herein as a simplified arrangement of switchover between a day and a night thermostat operation with relatively fixed thermostat settings and with provision for disabling or changing back to the day thermostat operation for limited periods of night occupancy when such is desired. Further, this improved thermostat system includes a provision for returning to the proper thermostat setting automatically in the event that the apparatus is not returned to proper operation after a limited period of night occupancy at daytime temperature levels is obtained. This switchover is effected with the conventional two control air pressure level and without the requirement of any mechanical linkage or connections to thermostat sensing elements and the valving associated therewith to simplify the thermostat system.

It is therefore an object of this invention to provide an improved thermostat system with day-night operation and with provision for night setback. Another object of this invention is to provide in a system of this type a simplified arrangement for effecting night setback and return to proper level of operation automatically. Still another object of this invention is to provide an improved thermostat system of this type which utilizes simple bleed type pneumatic controllers or valving associated with the sensors and without the requirement of mechanical linkages to add complexity and inaccuracies to the thermostat portion of the system. These and other objects of this invention will become apparent from a reading of the attached description together with the drawing which shows schematically the various components making up the improved thermostat system.

The schematic diagram or drawing shows a pair of condition sensors or themostats for day-night operation indicated generally at 10 and 11 each of which has its own sensing element such as bimetals 14 and 15 respectively carrying levers or flappers 18, 19 which in turn cooperate with nozzles 20, 22 respectively to form simple bleed type pneumatic controllers or valving. For the purpose of the present disclosure, the thermostat or controller 10 will be identified as the day thermostat and that identified as 11 will be the night thermostat. Each of the thermostats has a separate setting mechanism indicated schematically by the biasing springs 24, 26 attached to levers 18, 19 respectively and being adjusted through levers 28, 30 in accordance with a cooperating setting device or screw means 32, 34. Each of the thermostats will be set for a different control point, as for example, the thermostat 10 will be set with a control point corresponding to a temperature of 72° F. while the night thermostat will be set for a temperature level corresponding to a 60° F.

These pneumatic bleed type controllers are connected to a two-level control air source 40 by the pipe 39 which will have two different control air pressure levels applied. As an example, the daytime control air pressure level will be approximately 13 p.s.i. while the nightime pressure will be approximately 17 p.s.i. This control air source 40 connects to a conventional restriction 42 by means of pipe 44 and leads to a switchover relay indicated generally at 50.

Switchover relay 50 is a valve apparatus similar to a three way valve designed to switch the control air source 40 to one or the other of the thermostats 10 or 11. Thus as will be seen in the drawing, the air supply conduit 44 leads to an inlet port 55 in the casing 60 of the switchover relay which includes a recess or chamber 62 therein exposed to the main line or the control air line pressure. Chamber 62 has a pair of diaphragms 64, 68 associated therewith which cooperate with valve seats 69, 70 respectively within the casing 60 to provide the valving for the switchover relay. As will be noted in the drawing, the effective cross sectional area of the diaphragm 64 exposed to chamber 62 is substantially smaller than the area of the diaphragm 68 exposed to chamber 62 when diaphragm 64 is seated by gravity. Passages 72, 74 surrounding the valve seats 69, 70 are connected to outlet ports 75, 76 respectively leading to the nozzles 22 and 20 of the night and day thermostats 11 and 10. Within the casing 60 of the switchover relay, the area behind the diaphragm 64 is exposed to atmosphere through a passage indicated at 80 while the area behind the diaphragm 68 indicated at 82, is sealed and connected to a conduit 84, for purposes to be later noted.

Under normal operation, control air pressure applied to the conduit 55 and chamber 62 will be impressed on the effective areas of the diaphragm 64, 68 and will cause the diaphragms to be simultaneously moved down or in the direction of the greatest force since the diaphragms are connected by a member or linkage 85 positioned in the chamber 62. This will open the valve formed by the diaphragm 68 and valve seat 70 allowing control air to flow from the chamber 62 through the passage or recess 74 and outlet port 76 to a conduit 88 leading to the nozzle 20 of the day thermostat for normal operation or daytime operation of the system. This normal operation of the switchover relay 50 presupposes that the chamber 82 behind the diaphragm 68 is at atmospheric pressure such as not to counteract the force applied against the diaphragm from within the chamber recess 62. Thus with no pressure in the chamber 82, the relative effective areas of the diaphragms 64, 68 will effect a pneumatic bias on the switchover relay causing it to maintain the connection with the day thermostat 10. In the event that a pressure is applied to the chamber 82 sufficient to counteract the effect of the force on the underside of the diaphragm 68 within the nozzle or seat 70, the diaphragms will be caused to move upward or in the direction of the force applied to the diaphragm 64 causing it to be lifted from its valve seat 69 and provide a passage from the chamber 62 through the passage or recess 72 and outlet port 75 to a conduit 90 leading to the nozzle 22 of the night thermostat for night operation. Each of these thermostats effects a bleed on the mainline or control air line 44 beyond the restriction 42 to establish a branch line pressure in a conduit 95 leading to a device to be actuated by the thermostat system which is shown herein schematically as a valve at 100. It will be recognized that this device may take many forms other than the valve and may actually be a number of control components (not shown).

The night operation of the thermostat system or switchover of the relay 50 for connection to the bleed controller 19, 22 of the night thermostat is effected by changing the pressure in the area 82 behind the diaphragm 68 in the switchover relay in a manner to be hereinafter described. The control air supply 40 also includes a conduit or piping 102 leading to a pressure responsive regulating means or valve means 104 having basically valve seats 105 and 109 positioned within a housing 106 and a cooperating valve closure member 107 which is biased by means of a spring 108 on the seat 105. An area 110 behind the valve disc or valve closure member 107 in the casing 106 of the pressure responsive means is connected by means of a conduit 112 to provide a passage out of the casing 106 of the pressure responsive regulating means in the event that the valve closure mmeber 107 is lifted from the valve seat 105 and against the valve seat 109. The area behind seat 109 is connected to atmosphere through a passage 113 in the casing 106. The spring 108 for this regulating device is adjusted by a conventional screw means 114 and the pressure responsive means is designed and adjusted to pass only the higher of the control air pressures applied thereto to conduit 112. Thus, under normal daytime operation, 13 p.s.i. applied under the valve seat 105 to the valve closure member 107 will be insufficient to overcome the spring force of spring 108 and no control air will flow through the passage 112. Under these conditions, conduit 112 is connected to atmosphere through seat 109 and passage 113. The passage 113 is connected to the input 119 of a setback mechanism indicated generally at 120 which has a first outlet passage 122 to which the conduit or pipe 84 from the switchover relay 50 is connected. The interior of the setback mechanism which is housed in a casing 140 includes a valve seat block 142 having a first valve seat 144 at one extremity thereof and a second valve seat 146 at the opposite extremity thereof with a passage 150 connecting the valve seats. Cooperating with the valve seat 144 is a disc like valve closure member 152 which is connected by means of a shaft 154 to a second plug type valve closure member 156 which cooperates with the valve seat 146. The casing 140 includes an aperture 158 therein which is larger in diametrical dimension than the valve closure member 156 to provide a second outlet air passage to the atmosphere whenever the valve formed by the closure member 156 and seat 146 is opened. The shaft 154 extends beyond the valve closure member 156 and terminates in a manual handle or operating means 160 positioned outside of the casing 140 for purposes to be later noted. The setback mechanism has its shaft and hence valve closure members 152, 156 biased by means of a spring 162 which rests against the valve closure member 152 at one extremity and a shoulder 164 in the passage 150 at the other extremity such that the valve formed by the disc 152 and seat 144 is normally open. Thus during normal nighttime operation, when the higher of the control air pressures of the supply source 40 is applied to the pressure responsive means 104, air under high pressure will be fed through the conduit 112 to the inlet 119 of the setback mechanism and through the normally open valve 152, 144 to the passage 150 leading to the outlet port 122 and conduit or piping 84 to apply the control air pressure to the chamber 82 of the switchover relay. Under these conditions the valve formed by the valve closure member 156 and seat 146 will be closed under the action of the spring 162 and control air pressure on the under side of the diaphragm 68 in a switchover relay will counteract the control air pressure present in the chamber 62 and acting on the underside of the diaphragm 68 within the valve seat 70 to permit the switchover relay to switch from the day to the night thermostat position. Under these conditions the flapper nozzle 19, 22, will control the bleed through the valve 64, 69 in the switchover relay to establish the branch line pressure to the device 100 or devices to be actuated. The day thermostat simultaneously will be isolated from the temperature control system by virtue of the fact that the valve formed by the diaphragm 68 and valve seat 70 in the switchover relay will be closed isolating the thermostat from the control air line and the device to be actuated.

Should it be necessary during this nighttime setting to return to the control of the daytime thermostat for limited occupancy of the building during the night, the setback means or valve 120 may be actuated manually by pulling the knob 160 and hence the shaft 154 up against the force of the spring 162 to close the valve formed by the disc 152 and seat 144. The night or higher control air pressure applied to the chamber under the valve closure member 152 will be effective at this time to hold or latch pneumatically the valve closure member 152 on its seat 144 closing the passage for the higher control air pressure from the conduit 112 and opening the valve formed by the valve closure member 156 and seat 146 permitting the chamber 82 under the diaphragm 68 of the switchover mechanism 50 to be vented to atmosphere. Under these conditions the switchover relay will connect the daytime thermostat to the device to be actuated in a conventional manner. If after this period of limited occupancy, such as for several hours during the evening, when the remaining portion of the building is on night time temperature setting, the occupants of the room fail to operate the setback mechanism 120 by moving the manual operating means 160 down to open the valve 152, 144, overcoming the pneumatic latching function of the setback mechanism, the apparatus will remain on daytime connection until the next control air pressure change. When the control air line 40 returns to the 13 p.s.i. control air pressure level, the pressure responsive means 104 will not permit the flow of air therethrough but rather will open conduit 112 to atmosphere and hence the pressure in the chamber of the setback mechanism under the valve closure member 152 will be reduced to the low pressure level or allowed to bleed down through the switchover of mechanism 120 so that the setback mechanism will drop the normally open position connecting the chamber 82 under the diaphragm 68 through the setback 120 to the regulating valve 104 which will have no pressure in the outlet side of the same. Therefore switch relay 50 will stay in the day position with the manual setback mechanism being returned to its normal position. The position of setback mechanism 120 and pressure responsive means 104 may be interchanged in the connection to supply 40.

Thus, it will be seen that with the use of the simplified thermostat system including bleed type controllers and independent setting mechanisms, the improved system may be pneumatically set or switched from one control pressure to another to effect day and night operation with night setback without requiring complexity in the thermostat or mechanical linkages connected thereto.

In considering this invention it should be remembered that the present disclosure is intended to be illustrative only and the scope of the invention should be determined only by the appended claims.

I claim as my invention:

1. A thermostat system comprising, a pair of thermostats each including a temperature sensor and a bleed type pneumatic controller operated thereby, setting means associated with each controller for setting the operating point for each controller for different temperatures sensed, a source of control air adapted to have two different pressure levels connected to a restriction, a switchover relay adapted to be connected to said control air source and having two separate output ports connected respectively to said bleed type controllers, said switchover relay being normally biased pneumatically to a control position in which one of said output ports and one of said controllers is connected to said control air source, pressure responsive means in said relay for overcoming said pneumatic bias and effecting switchover of said relay such that the other of said output ports and the other of said controllers is connected to said control air source, means connected to said control air source and adapted to be connected to a device to be controlled by said thermostats, additional pressure responsive means adapted to be connected to said control air source and pass air therefrom only at the higher of said control air pressure levels, setback means including a three-way valve having an inlet connected to said additional pressure responsive means, said setback means including a first outlet connected to said pressure responsive means of said switchover relay to provide a pressure to shift said relay from said control position, said setback means having a common movable element as a part of said three-way valve, and manual means connected to said movable element of said setback means and adapted to switch said three-way valve means to a valve position in which it will stay only when the higher of said pressure levels from said additional pressure responsive means is applied to said setback means.

2. A thermostat system comprising, a pair of thermostats each including a temperature sensor and a bleed type pneumatic controller operated thereby, a source of control air adapted to have two different pressure levels connected to a restriction, a switchover relay adapted to be connected to said control air source and having two separate output ports connected respectively to said bleed type controllers, said switchover relay being normally biased pneumatically to a control position in which one of said output ports and one of said controllers is connected to said control air source, pressure responsive means in said relay for overcoming said pneumatic bias and effecting switchover of said relay such that the other of said output ports and the other of said controllers is connected to said control air source, means connected to said control air source and adapted to be connected to a device to be controlled by said thermostats, additional pressure responsive means adapted to be connected to said control air source and pass air therefrom only at the higher of said control air pressure levels, setback means including a valve connected to said additional pressure responsive means, said setback means including an outlet connected to said pressure responsive means of said switchover relay to provide a pressure to shift said relay from said control position, said setback means including means for operating said valve of said setback means, and manual means connected to said operating means of said setback means to switch said valve to a valve position in which it will stay only when the higher of said pressure levels from said additional pressure responsive means is applied to said setback means.

3. A thermostat system comprising, a pair of thermostats each including a temperature sensor and a flapper nozzle type pneumatic controller operated thereby, setting means associated with each controller for setting the operating point for each controller for different temperatures sensed, a source of control air adapted to have two different pressure levels connected to a restriction, a switchover three-way valve adapted to be connected to said control air source and connected respectively to said flapper nozzle type controllers, said switchover valve being normally biased pneumatically to a control position in which one of said controllers is connected to said control air source, pressure responsive means in said relay for overcoming said pneumatic bias and effecting switchover of said valve such that the other of said controllers is connected to said control air source, means connected to said control air source and adapted to be connected to a device to be controlled by said thermostats, additional pressure responsive means adapted to be connected to said control air source and pass air therefrom only at the higher of said control air pressure levels, setback means including valve means having an inlet connected to said additional pressure responsive means, said valve means of said setback means including a first outlet connected to said pressure responsive means of said switchover valve to provide a pressure to shift said valve from said control position, said setback means having a movable element as a part of said valve means, and manual means connected to said movable element of said setback means and adapted to switch said valve means to a position in which it will stay only when the higher of said pressure levels from said additional pressure responsive means is applied to said setback means.

4. A thermostat system comprising, a pair of thermostats each including a temperature sensor and a bleed type pneumatic controller operated thereby, setting means associated with each controller for setting the operating point for each controller for different temperatures sensed, a source of control air adapted to have two different pressure levels connected to a restriction, a switchover relay adapted to be connected to said control air source and having two separate output ports connected respectively to said bleed type controllers, said switchover relay having a pair of diaphragms cooperating with a pair of valve seats to form a pair of valves connecting alternately said ports with said air source, said diaphragms having different sized areas such that said relay is normally biased pneumatically to a control position in which one of said output ports and one of said controllers is connected to said control air source, means associated with one of the diaphragms in said relay for overcoming said pneumatic bias and effecting switchover of said relay such that the other of said output ports and the other of said controllers is connected to said control air source, means connected to said control air source and adapted to be connected to a device to be controlled by said thermostats, additional pressure responsive means adapted to be connected to said control air source and including valving to pass air therefrom only at the higher of said control air pressure levels, setback means including a three-way valve having an inlet connected to receive the higher pressure from said additional pressure responsive means, said setback means including an outlet connected to said means associated with one of said diaphragms of said switchover relay to connect the pressure from said additional pressure responsive means thereto to shift relay from said control position, said setback means having a common movable element as a part of said three-way valve, and manual means connected to said movable element of said setback means and adapted to manually switch said three-way valve means to a valve position in which asid outlet is vented to atmosphere and in which it will stay only when the higher of said pressure levels from said additional pressure responsive means is applied to said setback means.

5. A thermostat system comprising, a pair of thermostats each including a temperature sensor and a bleed type pneumatic controller operated thereby, setting means associated with each controller for setting the operating point for each controller for different temperatures sensed, a source of control air adapted to have two different control pressure levels, a switchover valve adapted to be connected to said control air source and having two separate output ports connected respectively to said bleed type controllers, said switchover valve being normally biased pneumatically to a control position in which one of said output ports and one of said controllers is connected to said control air source, means responsive only to the higher of the control air pressures being connected to said switchover valve and effecting switchover of said valve such that the other of said output ports and the other of said controllers is connected to said control air source, means associated with said last named means for disabling said last named means, and means connected to said switchover valve and adapted to be connected to a device to be controlled by said thermostats.

6. A dual thermostat system comprising, a pair of thermostats each including a temperature sensor and a bleed type pneumatic controller operated thereby, setting means associated with each controller for setting the operating point for each controller for different temperatures sensed, a source of control air adapted to have two different control pressure levels, a switchover valve adapted to be connected to said control air source and having two separate output ports connected respectively to said bleed type controller, said switchover valve being normally biased pneumatically to a control position in which one of said output ports and one of said controllers is connected to said control air source, means responsive only to the higher of the control air pressures being connected to said switchover valve and effecting switchover of said valve such that the other of said output ports and the other of said controllers is connected to said control air source, manual means associated with said last named means for disabling said last named means and being adapted to be held in a pneumatic latched position after being manually initiated only when the higher of said control air pressures is applied thereto, and means connected to said switchover valve and adapted to be connected to a device to be controlled by said thermostats.

7. A pneumatic control system comprising, a pair of condition controllers each including a sensor and a bleed type pneumatic valve operated thereby, setting means associated with each controller for setting the operating point for each controller for different temperatures sensed, a source of control air adapted to have two different control pressure levels, a switchover valve means connected to said control air source and having two separate output ports connected respectively to said bleed type valves, said switchover valve means being normally biased pneumatically to a control position in which one of said output ports and one of said condition controllers is connected to said control air source, means responsive only to the higher of the control air pressures being connected to said switchover valve and effecting switchover of said valve means such that the other of said output ports and the other of said condition controllers is connected to said control air source, means associated with said last named means for disabling said last named means, and means connected to said switchover valve means and adapted to be connected to a device to be controlled by said thermostats.

8. A pneumatic control system comprising, a pair of condition controllers each including a sensor and a bleed type pneumatic valve operated thereby, a source of control air adapted to have two different control pressure levels, a switchover valve means connected to said control air source and having two separate output ports connected respectively to said bleed type valves, said switchover valve means being normally biased pneumatically to a control position in which one of said output ports and one of said condition controllers is connected to said control air source, means responsive only to the higher of the control air pressures being connected to said switchover valve means and effecting switchover of said valve means such that the other of said output ports and the other of said condition controllers is connected to said control air source, means associated with said last named means for disabling said last named means, and means connected to said switchover valve means and adapted to be connected to a device to be controlled by said thermostats.

9. A pneumatic control system comprising, a pair of condition controllers each including a sensor and a bleed type pneumatic valve operated thereby, a source of control air adapted to have two different control pressure levels, a switchover valve means connected to said control air source and having two separate output ports connected respectively to said bleed type valves, said switchover valve means being normally biased pneumatically to a control position in which one of said output ports and one of said condition controllers is connected to said control air source, means responsive only to the higher of the control air pressures being connected to said switchover valve means and effecting switchover of said valve means such that the other of said output ports and the other of said condition controllers is connected to said control air source, manual means associated with said last named means for disabling said last named means and adapted to be held in a pneumatic latched position after being manually initiated only when the higher of said control air pressures is applied thereto, and means connected to said switchover valve means and adapted to be connected to a device to be controlled by said thermostats.

10. A thermostat system comprising, thermostat means including a bleed type pneumatic control, setting means associated with said thermostat means for setting the operating point for two different temperature settings to effect day-night operation, a source of control air having two different control pressure levels, switchover valve means adapted to be connected to the control air source and being connected to said thermostat means to switch said thermostat means alternately between said different settings for day-night operation, pressure responsive means associated with said switchover means and connected to said control air source being responsive only to the higher of said control air pressures to effect operation of said switchover means and alternate switching of said thermostat means between said different settings, pneumatic means adapted to be manually operated associated with said last named means for disabling said last named means, and means connected to said switchover valve and adapted to be connected to a device to be controlled by said thermostat system.

11. A thermostat system comprising, thermostat means including a penumatic control, setting means associated with said thermostat means for setting the operating point for two different temperature settings to effect day-night operation, a source of control air having two different control pressure levels, switchover valve means adapted to be connected to the control air source and being connected to said thermostat means to switch said thermostat means alternaelty between said different settings for day-night operation, pressure responsive means associated with said switchover means and connected to said control air source being responsive only to the higher of said control air pressures to effect operation of said switchover means and alternate switching of said thermostat means between said different settings, pneumatic means adapted to be manually operated associated with said last named means for disabling said last named means and adapted to be held in a pneumatic latched position after being manually initiated only when the higher of said control air pressures is applied thereto, and means connected to said switchover means and adapted to be connected to a device to be controlled by said thermostat system.

References Cited by the Examiner
UNITED STATES PATENTS

| | | | |
|---|---|---|---|
| 1,597,350 | 8/26 | Fortier | 236—83 |
| 1,724,347 | 8/29 | Fortier | 236—87 |
| 2,727,691 | 12/55 | Alyea et al. | 236—38 |

ALDEN D. STEWART, *Primary Examiner.*